June 23, 1953 D. W. GILL 2,642,924
COLLAPSIBLE VEHICLE FOR CHILDREN
Filed Jan. 13, 1950 2 Sheets-Sheet 1

INVENTOR.
DONALD W. GILL,
BY
ATTORNEYS.

June 23, 1953        D. W. GILL        2,642,924
COLLAPSIBLE VEHICLE FOR CHILDREN
Filed Jan. 13, 1950        2 Sheets-Sheet 2
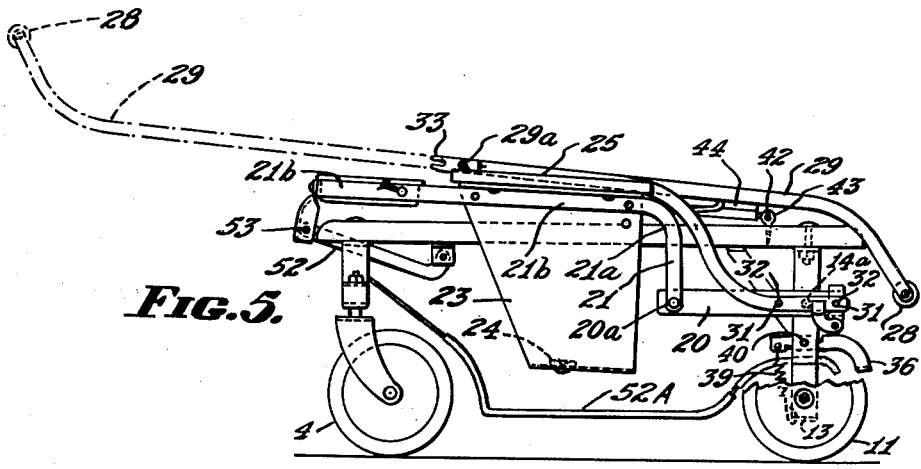
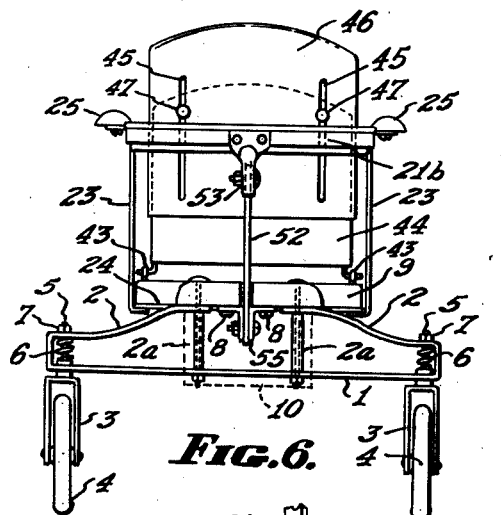
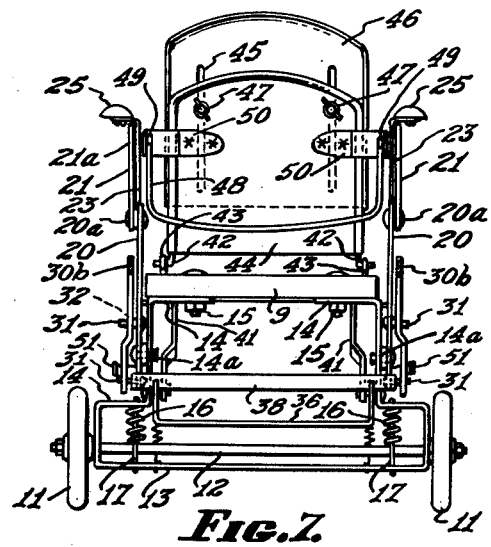
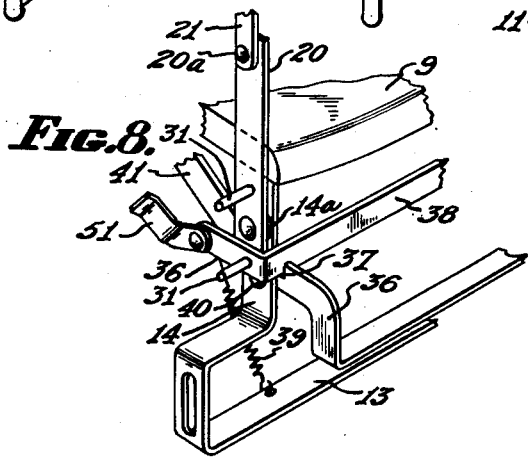
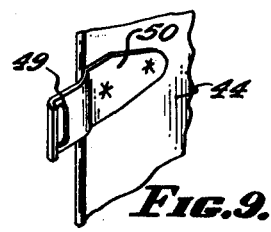
INVENTOR.
DONALD W. GILL,
BY
ATTORNEYS.

Patented June 23, 1953

2,642,924

UNITED STATES PATENT OFFICE 2,642,924

COLLAPSIBLE VEHICLE FOR CHILDREN

Donald W. Gill, Cincinnati, Ohio, assignor to The Frank F. Taylor Company, Norwood, Ohio, a corporation of Ohio Application January 13, 1950, Serial No. 138,475

5 Claims. (Cl. 155—22)

My invention relates to improvements in children's vehicles of the baby walker, stroller type having front and rear rolling supports and to structural improvements whereby such vehicles may be collapsed when not in use.

Since a large part of the young married couples of the country are being more and more concentrated in two and three room apartments and small houses, the space occupied by children's vehicles becomes a very important matter. Further the convenience of being able to carry a collapsed child's vehicle of this type without any handles or wheels sticking out and catching against furniture or other equipment in the home, is of importance.

In the modern automobile it is almost impossible to transport a baby walker or stroller without going through a laborious process of removing the push handle, floor boards and the like, so that it will fit into such space as may be available.

It is the object of my invention, while keeping substantially all the features which have made this type of vehicle universally acceptable, to assemble the vehicle on a new constructive principle which makes collapsing of the vehicle into a space less than one third that occupied by the vehicle when opened up for use, a simple matter, requiring a minimum of adjustments and manipulations.

The foregoing broad object and other objects to which specific reference will be made in the following description, I accomplish by that certain combination and arrangement of parts of which I have illustrated a preferred embodiment.

In the drawings:

Figure 5 is a side elevation showing the vehicle completely collapsed and showing the normal position of the floor board when the vehicle is used as a stroller.

Figure 6 is a front elevation taken on line 6—6 of Figure 2 of the vehicle.

Figure 7 is a sectional view of the vehicle from the rear along the lines 7—7 in Figure 2.

Figure 8 is an enlarged view showing details of the latching mechanism.

Figure 9 is a fragmentary perspective view showing details of the back supporting mechanism.

Figure 1:
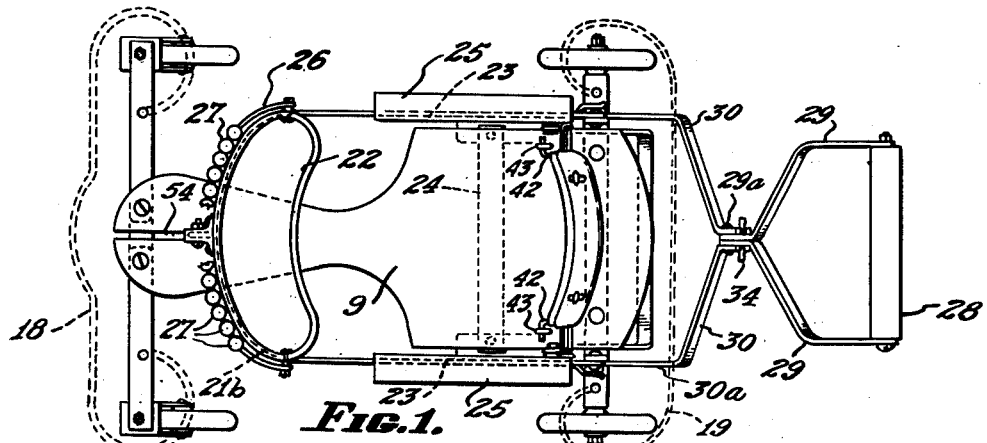
Figure 1 is a plan view of the vehicle.

The type of child's vehicle to which my inventions are directed is the type which, with the push handle and floor board removed, a child can use in the house, directing its movement by walking action of the feet against the floor. By the attachment of a long push handle and the installation of a floor board the baby walker is converted into a stroller conveyance and the mother, going to the store can conveniently push the child along just as if the vehicle were a conventional baby carriage.

As shown in the drawings, Figure 6, the front assembly is conventional, consisting of cross frame members comprising a horizontal lower bar 1 and an upwardly bowed upper bar 2. The forked members 3 which journal the caster wheels 4 have vertical pivot pins 5 extending between the bars 1 and the bars 2. Springs 6 extending around the vertical pivot pins 5 are tensioned by means of nuts 7 secured in threads at the upper ends of the pins 5. Thus a resilient caster mounting is provided, the caster stocks being free to pivot on a vertical axis.

The upwardly bowed portion of the bars 2 are secured as with bolts 2a to the front end of the seat board shown at 9.

A shield 10, indicated in dotted lines and which is primarily for decorative purposes, resembling the front of the hood of an automobile may also form part of the structure. The shield 10 serves to house the link mechanism which supports the front end of the tray board as will be described later.

Thus the front assembly consists in an assembly rigidly mounted at the narrowed front end of the seat board supported on casters, the stocks of which are free to rotate on a vertical axis, the casters being rotatable on a horizontal axis.

At the rear, as shown in Figure 7, the two non-pivoted rear wheels 11 are journaled on an axle 12. As at the front there is a lower straight cross bar 13 and upwardly bowed upper crossbars 14 which are secured to the rear end of the seat board 9 as with bolts 15.

Springs 16 secured on tie rods 17 extend from underneath the cross bars 14 and bear down against the rear axle 12 thereby providing a resilient mounting for the rear wheels.

Thus far the rear assembly is conventional. Bumper bars 18 at the front and 19 at the rear are also conventional and these are indicated in dotted lines in Figure 1.

I will now describe the novel features of construction which make the vehicle collapsible.

Pivoted in vertical portions of the bars 14 there are lower links 20, one on each side which are fixedly pivoted to the vertical portions of the bars 14 as shown at 14a. The links 20 are also pivoted to upper links 21 as indicated at 20a. The upper link extends upwardly as indicated at 21a and then comes forwardly in a bowed portion 21b which surrounds the front of the tray 22.

The stiff side panels 23, instead of being fastened to the seat board 9, are suspended from the bowed portions 21b of the upper link. This conception of having the stiff side wall members 23 independently supported so as to be movable downwardly to occupy the space between the seat board and the floor board, is one of the inventive concepts which makes the unique collapsing feature of the vehicle possible. Underneath the seat board there is a cross bar 24 which connects the lower ends of the side panels. Also carried by the upper ends of the members 23 are the arm rests 25.

Instead of the conventional rigid front steering post, the handles of which the child usually grasps, particularly when the vehicle is used as a baby walker, there is provided a pivoted bar 26, shown in the drawing as mounting a series of colored balls 27. This bar may be swung upwardly and provides a handle which a child can securely grasp.

The push handle consists of a handle rod 28 connected at its end with side bars 29 which are connected to outwardly bowed bars 30, as indicated at the pivot 29a. The upright links 20 are provided with pins 31 and the ends 30a of the side bars 30 are provided with spaced holes 32 into which the pins 31 fit, the bars 30a being tensioned inwardly toward a lesser distance than that of the width of the seat board so that the push handle is held in tensioned position. While it may be removable, the push handle is so constructed that it is seldom necessary to remove it except when the vehicle is used as a baby walker.

The bars 29 come together and are pivoted to the bars 30 as indicated at 29a. The upper ends of the bars 30 are provided with recesses 33 into which the enlarged ends of a pin 34 fit. The pin 34 is retained within a slot 35 in the bars 29. Thus by manually pulling up the enlarged ends of the pin 34 the rigid connection between the bars 29 and 30 is released leaving the bars 29 free to pivot rearwardly, as shown in Figure 5, when the parts are moved to collapsed position.

The latch which holds the vehicle in upright usable position is best shown in the detail view in Figure 8 and consists of a hinged bar 36 having slots 37 which interlock with a laterally extending bar 38. Springs 39 extend down to the straight cross bar 13 and these are tensioned to the ends of the bar 36 which is pivoted as indicated at 40 to the brace rods 41 which extend up from the upright portions of the bars 14 to underneath the seat board 9, as indicated.

The back rest for the seat board is also arranged to swivel with collapsing of the vehicle. To a bail member 42 pivoted in eyelets 43 on the upper surface of the seat board 9 there is crimped the lower portion 44 of the back rest. Slidably mounted in slots 45 in an upper portion 46 of the back rest the shanks of thumb nuts 47 are extended. By loosening the thumb nuts the upper portion 46 of the back rest is vertically adjustable with relation to the lower portion 44. Another bail member 48 pivoted to the side panels 23 extends through slots 49 in brackets 50 welded to the lower panel 44. The necessity of this construction is to permit folding up on a different pivot point than the main pivotal axis 14a of the linkage mechanism described. The bail 48, when swung up to a horizontal position, permits the back rest to swivel back to a reclining position.

Locking lugs 51 pivoted on the ends of the cross bar 38 may be moved into a position to lock the push handle assembly in position.

As to modifications in the push handle illustrated, I may, as disclosed in my Patent No. 2,492,981, employ an intermediate member to support a bag or package in back of the back rest. For purposes of clearness, most of the figures are illustrated with certain removable parts removed. It should be understood that in accordance with conventional practice a foot rest panel as shown at 52A in Figure 5 and having front and back bars which extend in over cross frame members of the vehicle and which permit removal by lengthwise manipulation, form part of the assembly when the vehicle is used as a stroller.

To balance the strain on the linkage mechanism including the link 21b, there is arranged at the front of the vehicle and secured to the front end of the tray supporting bar, a link 52 pivoted at the front of the tray as indicated at 53. The link extends through a slot 54 (Figure 1) in the front end of the seat board, and is pivoted as at 55 underneath the seat board. Such construction causes the link 21b to move forwardly and at the same time downwardly while maintaining a substantially horizontal position.

Figure 4:
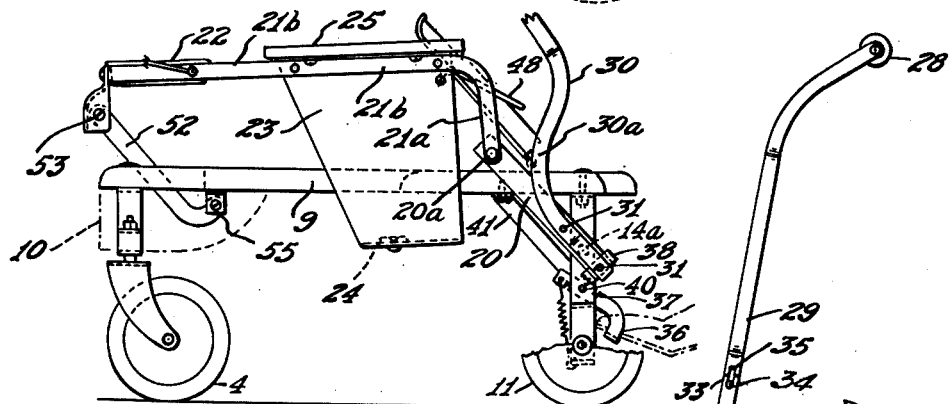
Figure 4 is a side elevation showing the vehicle partly collapsed.
Figures 2, 3:
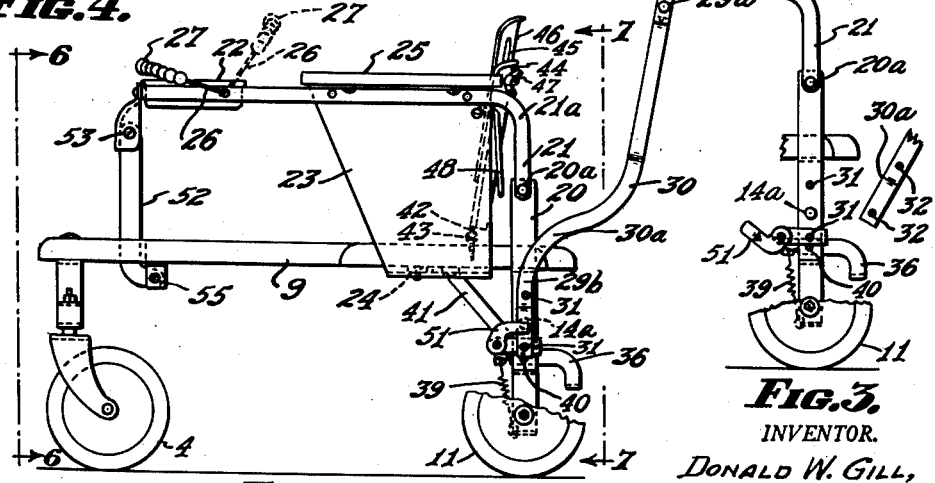
Figure 2 is a side elevation with parts broken away.
Figure 3 is a fragmentary view, being a side elevation with the push handle and bars removed.

Comparing Figures 2, 4 and 5 it will be observed that in Figure 2 the vehicle is erect ready for occupancy as a stroller. It will be understood that the foot rest, normally in position, is not shown in Figure 2. By pressing down on the treadle assembly 36, the latching slots 37 become disengaged with the cross bar 38 and pushing the handle forward as shown in Figure 4, the link 21a maintains its upright position while the link 20 swings down in an arc about the pivot point 14a. When the links and side board members have moved down to the position of the parts shown in Figure 5, the pin 34 is moved up in the slot 35 and the upper members of the push handle are swung back on the pivot 29a from the position of the dotted lines in Figure 5 to the position of the solid lines. In this position the bar 28 and the bumper bar 19 are in alignment and close together and the vehicle can be carried with one hand.

Referring to Figure 2 the vehicle requires a space equal to the width of the vehicle—a depth of 36 inches and a length of 36 inches. When folded up as shown in Figure 5 it occupies a space the width of the vehicle with a depth of 12 inches and a length of 26 inches. Since the drawings are substantially on a scale of $\frac{3}{16}$ inch to the inch, the comparative decrease in the space required in collapsed condition as compared to fully upright, is in the nature of a ratio of about one to four. In other words, only one fourth the space is required for the vehicle when collapsed as compared to fully extended for use.

When the vehicle is not used as a stroller, but merely as a baby walker, the foot supporting panel and push handle assembly are not attached to the vehicle. By the application of short bars cut off as indicated at 30b in Figure 7, a convenient means is provided by which the vehicle may be collapsed. Or other means may be provided for actuating the linkage mechanism.

In the description, the words links, floor board, seat board, pivot and tray are used. It should be understood that the elements function in this new combination irrespective of the material of which the parts are made, and that equivalent mechanical elements will readily occur to those skilled in the art to accomplish the same functional effect.

Having thus described my invention, what I claim as new and desire to secure by Letters Patent is:

1. A child's vehicle of the baby walker, stroller type having front and rear rolling supports, a seat board for a child to straddle supported in spaced position above said rolling supports, a demountable foot supporting panel mounted in position below said seat board, an adjustable back rest pivoted on said seat board, a relatively stiff side panel assembly and means for mounting said relatively stiff side panel assembly independent of said back rest for cooperating with said seat board in such position as to be movable down into the space between said seat board and said foot supporting panel, a hinged push handle assembly and a latching member for maintaining the push handle assembly in operative position, a linkage mechanism supporting said side panel assembly with which said push handle assembly is operatively connected, and a foot treadle for disengaging said latching member.

2. A child's vehicle of the baby walker, stroller type having front and rear rolling supports, a seat board for a child to straddle supported in spaced position above said rolling supports, a demountable foot supporting panel mounted in position below said seat board, an adjustable back rest pivoted on said seat board, a relatively stiff side panel assembly and means for mounting said relatively stiff side panel assembly independent of said back rest for cooperating with said seat board in such position as to be movable down into the space between said seat board and said foot supporting panel, a hinged push handle assembly and a latching member for maintaining the push handle assembly in operative position, and means comprising a linkage mechanism carrying said independent side panel assembly and having an element thereof extending horizontally and attached to said side panel assembly.

3. A child's vehicle of the baby walker, stroller type having front and rear rolling supports, a seat board for a child to straddle supported in spaced position above said rolling support, a demountable foot supporting panel mounted in position below said seat board, an adjustable back rest pivoted on said seat board, a relatively stiff side panel assembly and means for mounting said relatively stiff side panel assembly independent of said back rest for cooperating with said seat board in such position as to be movable down into the space between said seat board and said foot supporting panel, a hinged push handle assembly and a latching member for maintaining the push handle assembly in operative position, and means comprising a linkage mechanism carrying said independent side panel assembly having an element thereof extending horizontally and attached to said side panel assembly, said push handle assembly being detachable from the vehicle and provided with means for operatively connecting with said linkage mechanism.

4. A child's vehicle of the baby walker type having a straddle board mounted in fixed position above front and rear rolling supports and a side panel assembly for cooperation with said straddle board, a linkage assembly carrying said side panel assembly and actuable to move said side panel assembly into the space between said straddle board and said rolling supports, said linkage assembly also carrying a tray having a hand holding device mounted thereon, and a back rest pivotally mounted on said straddle board and foldable downwardly against the surface of said straddle board and interconnecting means actuable in combination with said linkage assembly for folding said back rest downwardly during actuation of said linkage assembly.

5. A child's vehicle of the baby walker type having a straddle board mounted in fixed position above front and rear rolling supports and a side panel assembly for cooperation with said straddle board, a linkage assembly carrying said side panel assembly and actuable to move said side panel assembly into the space between said straddle board and said rolling supports, and a back rest pivotally mounted on said straddle board and foldable downwardly against the surface of said straddle board and interconnecting means actuable in combination with said linkage assembly for folding said back rest downwardly during actuation of said linkage assembly.

DONALD W. GILL.

References Cited in the file of this patent
UNITED STATES PATENTS

| Number | Name | Date |
|---|---|---|
| 2,451,956 | Kemper | Oct. 19, 1948 |
| 2,455,168 | Gilmore | Nov. 30, 1948 |
| 2,502,089 | Halliwell | Mar. 28, 1950 |
| 2,576,356 | Peterson | Nov. 27, 1951 |